May 20, 1958 E. O. ENGELS ET AL 2,835,374
AUTOMATIC LOADERS FOR PROOFERS
Filed Oct. 13, 1955 2 Sheets-Sheet 1

INVENTORS
EUGENE O. ENGELS
HAROLD J. DALEY
BY
Fearman & Fearman
ATTORNEYS

INVENTORS
EUGENE O. ENGELS
HAROLD J. DALEY
BY

ATTORNEYS

United States Patent Office 2,835,374
Patented May 20, 1958

2,835,374

AUTOMATIC LOADERS FOR PROOFERS

Eugene O. Engels and Harold J. Daley, Saginaw, Mich., assignors to Baker Perkins, Inc., Saginaw, Mich.

Application October 13, 1955, Serial No. 540,294

6 Claims. (Cl. 198—31)

This invention relates to loaders for dough proofers and more particularly to high capacity loading apparatus capable of being operated in a production line conjointly with high speed bakery machinery.

One of the prime objects of the instant invention is to provide an improved loader of greatly increased capacity which is designed to handle dough pieces at rates of speed in keeping with the accelerated production rates of modern day dividers, rounders, and dry proofers.

While dough proofers of a given size cannot be operated beyond a certain maximum rate of speed if the dough is to properly recuperate from the dividing and rounding operations they can, of course, be enlarged and the rate of travel of the proofer trays can be accelerated providing the operation of the divider and rounder can be speeded up and loading apparatus is available to load the dough pieces at a similarly increased rate of speed. Considerable difficulty has been encountered when the rate of operation of conventional loading apparatus has been accelerated to process the doughpieces at an increased rate of speed. It was found that the individual doughpieces had to so rapidly follow one another that often one would catch another if the preceding doughpiece was even slightly delayed and "doubles" would be formed which would have to be removed by the operator. Where the doughpieces were to follow one another down a slideway and gates or the like were to open to channel them into separate chutes it was not possible to achieve the desired production rate because the gates could not be operated fast enough to avoid the formation of "doubles."

A further object of the instant invention is accordingly to provide loading apparatus of this type which splits the flow of doughpieces so that successive doughpieces take different paths of travel and at least double the time is permitted for the various channeling gates, which we employ opposite the various pockets in the proofer tray, to open and close.

Another object of the invention is to provide greatly simplified loading apparatus which is reliable and efficient in operation at high speeds of operation and effectively segregates the doughpieces so that the formation of "doubles" is avoided.

A further object of the invention is to provide loading apparatus which is designed so that all its parts and surfaces are readily accessible for cleaning and so conforms with existing sanitary codes and promotes sanitation in the baking industry.

A still further object of the invention is to design loading apparatus which can be very economically manufactured and assembled.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

Briefly the invention includes means for delivering the doughpieces alternately to one or the other of at least a pair of pitched distributing slideways which are designed with selectively operated gates segregating the doughpieces for distribution to certain pockets in the trays.

In the drawings:

Fig. 1 is a rear elevational view of the loading apparatus showing the proofer tray in position to receive doughpieces, the view illustrating an operative position of the loader distributor in which a certain gate is raised to pass a doughpiece and another is closing after having permitted a doughpiece to enter the chute underneath it.

Fig. 3 is a side elevational view of the doughpiece distributor only.

Fig. 4 is a fragmentary sectional view through the timing wheel when a rightwardly sloped pocket is in the same position as is the leftwardly sloped pocket in Fig. 1.

Figure 2:
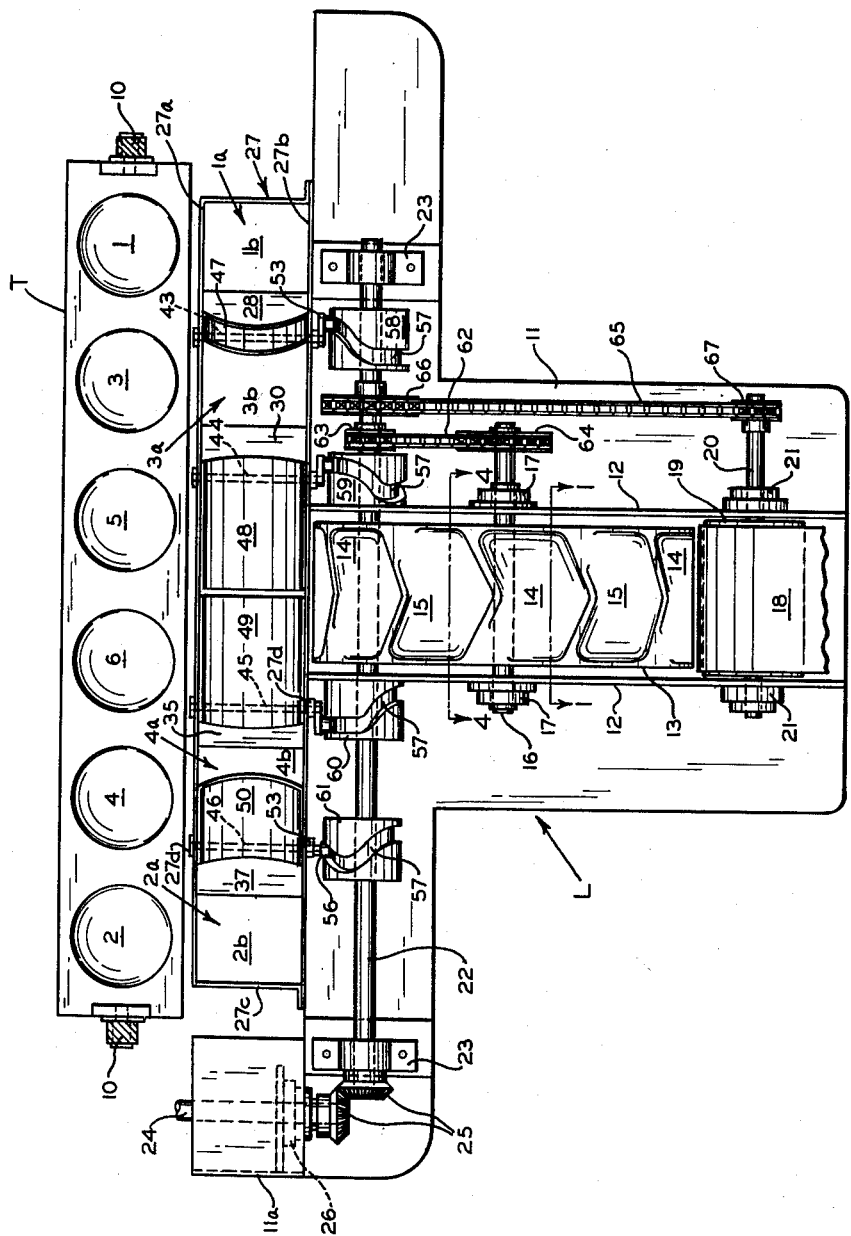
Fig. 2 is a top plan view thereof, the guards or housing for the drive elements being omitted to expose them to view.

Referring now more particularly to the accompanying drawings in which we have shown a preferred embodiment of the invention only, a letter T generally indicates a proofer tray which is shown as having six compartments numbered 1, 3, 5, 6, 4, and 2 from left to right in Fig. 1, but which could of course have more or less compartments if desired. The tray is arranged to be moved upwardly past the loading apparatus which we have generally designated L on the endless proofer chains 10 in the same manner as in Patent No. 1,890,740 and it should not be necessary to further illustrate or describe the proofer in this application inasmuch as proofers of this design are well known in the art.

The loader apparatus L includes a base frame 11 on which are mounted a pair of spaced apart, timer wheel, housing members 12 which support a timing or delivery wheel 13. The wheel 13 which includes circumferentially spaced pockets 14 and 15 alternately pitched to the left and right (Fig. 1) sides of the wheel is rigidly mounted on a shaft 16 in bearings 17 on the members or plates 12. Forwardly of the wheel 13 a belt conveyor 18 trained around a pulley or roller 19 leads from the rounding machine and supplies the doughpieces D to the wheel. The pulley 19 is mounted on a shaft 20 which is journaled in bearings 21 on the frame plates 12.

As will be seen both the wheel shaft 16 and conveyor drive shaft may be driven from a main shaft 22 which is journaled in raised bearings 23 on the base frame 11. In order that the wheel 13 will travel in synchronism with the travel of the trays T the proofer drive shaft 24, from which the chains 10 are driven, is geared as at 25 to the shaft 22 and furnishes the driving power for the shaft 22. A bearing 26 may be provided in an extension 11a of the base frame 11 to support the extending end of proofer shaft 24 and guard housings G (Fig. 1) may be provided to house the wheel drive elements.

Mounted on the rear wall of the frame 11 is a distributor housing 27 which includes rear and front walls 27a and 27b respectively and end walls 27c. Spacers or partitions 28, 29, 30, 31, 32, 33, 34, 35, 36 and 37 span the rear and front walls 27a and 27b to form compartments or chutes 1a, 3a, 5a, 6a, 4a, and 2a from left to right in Fig. 1 respectively, which are provided with downwardly pitched floor plates 1b, 3b, 5b, 6b, 4b, and 2b respectively. Chutes 1a and 2a additionally have more severely pitched extensions 1c and 2c. The walls 28—29, 30—31, 32—33, 34—35, and 36—37 may each comprise return bent, sheet metal plates supported on hanger rods 38, 39, 40, 41, and 42 which span the walls 27a and 27b and it will be observed that the rods 38—42 are disposed in inverse V arrangement with the central rod 40 at the apex of the V secured centrally with respect to the width of wheel 13. The rods 38, 39, 41, and 42 are so arranged and the walls 28—37 are of such height that the chutes 1a—6a are each on a different level (see Fig. 3).

As the tray T proceeds upwardly the doughpieces are passed through chutes 1a, 2a, 3a, 4a, 5a, and 6a successively and openings 1c, 2c, 3c, 4c, 5c, and 6c are cut in the rear wall 27a of the housing 27 to pass them to the corresponding pockets in the tray.

Mounted on pivotal shafts 43, 44, 45, and 46, which span walls 27a and 27b and are supported in bearings 27d thereon, are flaps or trap doors 47, 48, 49, and 50 which are adapted to selectively bridge walls 29—30, 31—32, 33—34, and 35—36 respectively to close off chutes 3a, 5a, 6a and 4a and furnish flat surfaces constituting slideways over which the doughpieces can slide. The flaps or gates 47—50 are fixed on shafts 43—46 which when pivoted swing the flaps outwardly to open a given chute to a doughpiece. The shafts 43 and 46 which control doors 47 and 50 are provided with upwardly extending levers 52 and 53 fixed on the projecting ends of the shafts which extend beyond the bearings 27a on wall 27b, while the shafts 44 and 45 which control doors 48 and 49 are provided with depending levers 54 and 55 which are similarly fixed on the projecting ends of the latter shafts. Follower rollers 56 on the levers 52—55 ride in the track grooves 57 provided in the cams 58—61 respectively which as shown are mounted on the main shaft 22, and plainly these cams are designed to sequentially open and close the doors 47—50.

Before describing the operation of the device it should be noted that the timer wheel shaft 13 is driven from the main or cam shaft 22 by a chain 62 which is trained around sprockets 63 and 64 on the shafts 22 and 16 respectively. Similarly the conveyor shaft 20 is driven from shaft 22 by a chain 65 trained around sprockets 66 and 67 on the shafts 22 and 20 respectively.

In the operation of the loader doughpieces D proceeding from the rounder are passed from the conveyor 18 to the alternately pitched pockets 14 and 15 in the timing wheel 13. These pockets substantially span the width of wheel 13 and are closed by the side portions of the wheel as shown. The wheel 13, along with the conveyor 18 is, as noted, traveling in synchronism with the travel of the trays T on proofer chains 10 and the opening and closing of gates or flaps 47—50 is similarly in synchronism with the continuous travel of the trays T.

Assuming that a tray T has reached a position in its continuous upward travel in which it is just below chute extension 1c, a doughpiece will be delivered by one of the leftwardly pitched pockets 14 (Fig. 1) on top of closed door 48 and will slide down across closed door 47 to chute 1a and out to compartment 1 in the tray T. The succeeding doughpiece will be delivered by the following rightwardly sloping pocket 15 on top of closed door 49 and will slide down across closed door 50 to chute 2a and out to compartment 2 of the tray which has by this time moved up level with chute extension 2c. While the last mentioned doughpiece is proceeding to compartment 2, flap or gate 47 is being opened by cam 58 so that the third doughpiece, which drops from a pocket 14 on top of gate 48, slides into chute 3a to pocket 3 which has come abreast of the lower edge of chute floor 3b. In Fig. 1 the gate 47 has just started to close and gate 50 is being swung upwardly by cam 61 so that chute 4a receives the fourth doughpiece and delivers it to compartment 4 just as the latter comes abreast of the chute floor 4b.

The fifth doughpiece delivered from wheel 13 falls directly into chute 5a from a pocket 14 because the gate 48 is being raised by cam 59 while the fourth doughpiece is passing to the tray compartment 4, and the sixth doughpiece delivered falls directly into chute 6a when gate 49 is similarly opened by cam 60. By the time the tray T is abreast of chute 6a the following tray is just below compartment 1a and the cycle just described is ready to be repeated.

Since the doughpieces are dropped first on one side of the distributor housing and then on the other clearly a trap on one side can be almost fully opened during the time a doughpiece is being delivered on the other side and after receiving a doughpiece can be closed while a doughpiece is being delivered on the opposite side again. Even though the wheel 13 is revolving at a relatively rapid pace the successive doughpieces are effectively segregated and there is relatively little possibility that "doubles" will be formed.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

What is claimed is:

1. Loading apparatus for proofers, adapted to load a plurality of doughpieces into an elongated tray moving upwardly in the rear of said apparatus, comprising a distributor housing having a plurality of vertically staggered, rearwardly extending chutes arranged abreast of the path of travel of said tray, a pair of downwardly pitched, diverging slideways extending laterally to said chutes and above the same, each slideway including flaps above each of said chutes except said endmost chutes pivotal with relation to said distributor out of the plane of said slideway to interrupt said slideway and providing an opening to said chutes below, means delivering said doughpieces alternately to the slideways near the adjacent ends thereof, and means pivoting flaps on alternate slideways successively in timed sequence with the travel of said tray to channel doughpieces sequentially to each of said chutes.

2. The combination defined in claim 1 in which a laterally extending cam shaft is supported forwardly of said distributor, said flaps are rigid on shafts journaled in said distributor, and said means pivoting the flaps comprises cams with tracks therein and levers with followers riding in said tracks rigidly connected to said shafts.

3. The combination defined in claim 1 in which said means delivering said dough pieces alternately comprises a timing wheel with its axis parallel to said tray, the wheel having pitched pockets therein arranged to be deepest adjacent one side or the other of said wheel alternately so that the doughpiece is carried off center therein.

4. Loading apparatus for proofers, adapted to load a plurality of doughpieces into a longtudinally compartmented tray moving upwardly past said apparatus in the rear thereof, comprising a distributor housing comprising front and rear walls, longitudinally spaced partitions spanning said walls and forming a series of vertically staggered chutes disposed in inverse V arrangement with its apex between said chutes arranged approximately opposite the center of a tray traveling past the chutes, downwardly pitched floors for said chutes, the rear wall of said distributor having openings to permit doughpieces from said chutes to slide to the compartments in said tray, a series of adjacent flaps forming a pair of downwardly pitched, diverging slideways meeting at the said central point between the chutes, shafts fixed adjacent the lower edges of said flaps journaled in the distributor and spanning the front and rear walls thereof, levers fixed on said shafts, cam followers on said levers, a longitudinally disposed cam shaft forwardly of the distributor, cams on said cam shaft with tracks in which said followers move to pivot said levers and sequentially raise and lower said flaps, and a revolvable timing wheel with its axis longitudinally disposed and its center widthwise substantially opposite the said central point between the chutes, said wheel having laterally pitched pockets closed at the sides, with alternate pockets being pitched toward opposite sides of the wheel for delivering the doughpieces alternately on opposite sides of said apex to the pitched slideways and thereby alternately to the sets of chutes under the respective slideways.

5. Loading apparatus for proofers adapted to load a plurality of dough pieces into an elongated tray in rapid succession, said apparatus comprising a distributor having a row of chutes arranged to discharge dough pieces into said tray, slideways into said distributor diverging from a point intermediate said row of chutes and communicating with the latter, means for delivering dough pieces individually to said distributor and discharging successive dough pieces alternately on opposite sides of said point, a trap door over each chute operable in one position to form a part of a slideway and in another position to channel a doughpiece to a chute, and means operable in timed relation to the delivery of doughpieces to said distributor for moving each trap door to one of its said positions.

6. Loading apparatus for proofers adapted to load a plurality of doughpieces into an elongated tray in rapid succession, said apparatus comprising a distributor housing of substantially inverted V form arranged with its apex substantially centrally of said tray, slideways in said distributor housing diverging from said apex and terminating in chutes arranged longitudinally of said tray, and means for delivering doughpieces individually to said distributor housing and discharging successive doughpieces on opposite sides of said apex, said delivering means comprising a rotatable wheel having pitched, peripheral pockets therein for containing doughpieces, alternate pockets being pitched in oposite directions.

References Cited in the file of this patent
UNITED STATES PATENTS

| | | |
|---|---|---|
| 2,064,437 | Marasso | Dec. 15, 1936 |
| 2,066,869 | Wild | Jan. 5, 1937 |
| 2,675,917 | Powers | Apr. 20, 1954 |